(12) United States Patent
Hyde et al.

(10) Patent No.: US 8,705,017 B2
(45) Date of Patent: Apr. 22, 2014

(54) PHOTONIC FENCE (75) Inventors: Roderick A. Hyde, Redmond, WA (US); 3ric Johanson, Seattle, WA (US); Jordin T. Kare, Seattle, WA (US); Nathan P. Myhrvold, Bellevue, WA (US); Thomas J. Nugent, Jr., Bellevue, WA (US); Nels R. Peterson, Seattle, WA (US); Lowell L. Wood, Jr., Bellevue, WA (US)

(73) Assignee: Tokitae LLC, Bellevue, WA (US)

( * ) Notice: Subject to any disclaimer, the term of this patent is extended or adjusted under 35 U.S.C. 154(b) by 753 days.

(21) Appl. No.: 12/657,281

(22) Filed: Jan. 15, 2010

(65) Prior Publication Data
US 2010/0186284 A1   Jul. 29, 2010

Related U.S. Application Data (60) Provisional application No. 61/205,430, filed on Jan. 15, 2009.

(51) Int. Cl.
*G01P 3/36* (2006.01)

(52) U.S. Cl.
USPC ............................................ 356/28; 356/28.5

(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | | |
|---|---|---|---|
| 4,756,118 A | 7/1988 | Evans, II | |
| 4,876,721 A | 10/1989 | Kerr et al. | |
| 5,424,551 A | 6/1995 | Callahan | |
| 5,585,626 A * | 12/1996 | Beck et al. | 250/222.1 |
| 6,653,971 B1 | 11/2003 | Guice et al. | |
| 6,853,328 B1 | 2/2005 | Guice et al. | |
| 8,400,348 B1 * | 3/2013 | Guice et al. | 342/54 |
| 2001/0053162 A1 | 12/2001 | Shio et al. | |
| 2004/0093190 A1 | 5/2004 | Beroza et al. | |
| 2006/0181493 A1 | 8/2006 | Satoh | |
| 2006/0215885 A1 * | 9/2006 | Kates | 382/120 |
| 2006/0254522 A1 | 11/2006 | Shaw et al. | |
| 2007/0157323 A1 | 7/2007 | Carlson et al. | |
| 2007/0183631 A1 * | 8/2007 | Zhang et al. | 382/110 |
| 2010/0063744 A1 * | 3/2010 | Golombek et al. | 702/19 |

FOREIGN PATENT DOCUMENTS

| | | |
|---|---|---|
| CN | 1821848 A | 8/2006 |
| CN | 101170901 A | 4/2008 |
| RU | 2391818 C2 | 6/2010 |
| WO | WO 2006/101654 A2 | 9/2006 |

OTHER PUBLICATIONS

U.S. Appl. No. 13/004,943, Rubochkin Vladimir Nikolaevich.

(Continued)

*Primary Examiner* — Luke Ratcliffe
(74) *Attorney, Agent, or Firm* — Dorsey & Whitney LLP (57) ABSTRACT

A system for tracking airborne organisms includes an imager, a backlight source (such as a retroreflective surface) in view of the imager, and a processor configured to analyze one or more images captured by the processor to identify a biological property of an organism.

45 Claims, 7 Drawing Sheets

(56) References Cited

OTHER PUBLICATIONS

Acar, E. B. et al.; "Calorespirometric Determination of the Effects of Temperature on Metabolism of *Harmonia axyridis* (Col: Coccinellidae) from Second Instars to Adults"; Physiological Ecology; Bearing a date of 2004; pp. 832-838; vol. 33, No. 4; Entomological Society of America.

Acar, E. B. et al.; "Use of Calorespirometry to Determine Effects of Temperature on Metabolic Efficiency of an Insect"; Environmental Entomology; Bearing a date of 2001; pp. 811-816; vol. 30, No. 5; Entomological Society of America.

Benedict, Mark Q.; "Chapter One, Care and maintenance of anopheline mosquito colonies"; The Molecular Biology of Insect Disease Vectors, A Methods Manual; Bearing a date of 1997; pp. 3-12; First edition; Chapman & Hall; London, UK.

Braks, M. A. H. et al.; "The response of the malaria mosquito, *Anopheles gambiae*, to two components of human sweat, ammonia and L-lactic acid, in an olfactometer"; Physiological Entomology; Bearing a date of 2001; pp. 142-148; vol. 26; Blackwell Science Ltd.

Cator, Lauren J. et al.; "Harmonic Convergence in the Love Songs of the Dengue Vector Mosquito"; Science Express; Bearing a date of Jan. 8, 2009; pp. 1-6.

Charlwood, J.D. et al.; "The swarming and mating behaviour of *Anopheles gambiae* s.s. (Diptera: Culicidae) from São Tomé Island"; Journal of Vector Ecology; Bearing dates of Nov. 5, 2001, Jan. 16, 2002 and Dec. 2002; pp. 178-183.

Dekker, T. et al.; "L-lactic acid: a human-signifying host cue for the anthropophilic mosquito *Anopheles gambiae*"; Medical and Veterinary Entomology; Bearing a date of 2002; pp. 91-98; vol. 16; The Royal Entomological Society.

Emami, S.N. et al; "Morphological method for sexing anopheline larvae"; Journal of Vector Borne Diseases; Bearing a date of Dec. 2007; pp. 245-249; vol. 44.

Geier, Martin et al.; "A new Y-tube olfactometer for mosquitoes to measure the attractiveness of host odours"; Entomologia Experimentalis et Applicata; Bearing a date of Mar. 9, 1999; pp. 9-19; vol. 92; Kluwer Academic Publishers.

Ghaninia, Majid et al.; "Functional classification and central nervous projections of olfactory receptor neurons housed in antennal trichoid sensilla of female yellow fever mosquitoes, *Aedes aegypti*"; European Journal of Neuroscience; Bearing dates of Mar. 23, 2007, Jul. 20, 2007 and Jul. 26, 2007; pp. 1611-1623; Federation of European Neuroscience Societies and Blackwell Publishing Ltd.

Gibson, Gabriella et al.; "Flying in Tune: Sexual Recognition in Mosquitoes"; Current Biology; Bearing a date of Jul. 11, 2006; pp. 1311-1316; vol. 16; Elsevier Ltd.

Göpfert, Martin C. et al.; "Nanometre-range acoustic sensitivity in male and female mosquitoes"; Proceedings of the Royal Society of London B; Bearing dates of Oct. 22, 1999, Dec. 6, 1999 and 2000; pp. 453-457; vol. 267, The Royal Society.

Hoy, Ron; "A boost for hearing in mosquitoes"; PNAS; Bearing a date of Nov. 7, 2006; pp. 16619-16620; vol. 103, No. 45; The National Academy of Sciences of the USA.

Huang, Juan et al.; "Daily temperature profiles in and around Western Kenyan larval habitats of *Anopheles gambiae* as related to egg mortality"; Malaria Journal; Bearing dates of Jun. 6, 2006 and Oct. 12, 2006; pp. 1-9; vol. 5, No. 87; BioMed Central.

Miller, James R. et al.; "Finding and Accepting Host Plants"; Chemical Ecology of Insects; Bearing a date of 1984; pp. 127-157; Chapman and Hall Ltd.

NASA Tech Briefs; "An Automated Flying-Insect Detection System"; Bearing a date of Sep. 1, 2007; Printed on Jan. 21, 2010; pp. 1-2; located at http://www.techbriefs.com/content/view/2187/34/.

Patent Auction.com; "Method of protection from biting insects"; Printed on Apr. 6, 2011; pp. 1-2; located at http://www.patentauction.com/patent.php?nb=6549.

Pitts, R Jason et al.; "Antennal sensilla of two female anopheline sibling species with differing host ranges"; Malaria Journal; Bearing dates of Feb. 15, 2006 and Mar. 30, 2006; pp. 1-12; vol. 5, No. 26; BioMed Central.

Puri, Sarika N. et al.; "Electroantennogram and Behavioral Responses of *Culex quinquefasciatus* (Diptera: Culicidae) Females to Chemicals Found in Human Skin Emanations"; Journal of Medical Entomology; Bearing a date of Mar. 2006; pp. 207-213; vol. 43, No. 2; Entomological Society of America.

Schreck, C.E. et al.; "Mosquito Attraction to Substances from the Skin of Different Humans"; Journal of the American Mosquito Control Association; Bearing a date of Sep. 1990; pp. 406-410; vol. 6, No. 3.

Soumaré, M.L. et al.; "Ultrastructual studies of mosquito ovogenesis"; Tissue and Cell; Bearing dates of Dec. 19, 2003, Nov. 8, 2004 and Nov. 9, 2004; pp. 117-124; vol. 37; Elsevier Ltd.

Sutcliffe, James F.; "Distance Orientation of Biting Flies to Their Hosts"; Insect Science Applications; Bearing a date of Jun. 22, 1987; pp. 611-616; vol. 8, Nos. 4, 5, and 6; ICIPE—ICIPE Science Press.

Takken, Willem et al.; "Mosquito mating behaviour"; Bridging laboratory and field research for genetic control of disease vectors; 2006; pp. 183-188; Springer, Netherlands.

Yuval, Boaz et al.; "Energy budget of swarming male mosquitoes"; Ecological Entomology; Bearing a date of 1994; pp. 74-78; vol. 19.

PCT International Search Report; International App. No. PCT/US 10/00111; bearing a date of May 25, 2010; pp. 1-5.

Gladwell, Malcolm; "Annals of Innovation: In the Air: Who says big ideas are rare?"; The New Yorker; bearing a date of May 12, 2008; printed on Jan. 15, 2009; pp. 1-8; located at http://www.newyorker.com/reporting/2008/05/12/080512fa_fact_gladwell.

Moore, Aubrey; "Artificial Neural Network Trained to Identify Mosquitoes in Flight"; Journal of Insect Behavior; bearing a date of 1991; pp. 391-396; vol. 4, No. 3; Plenum Publishing Corporation.

Robertson et al.; "Heritability of Wing-Beat Frequency in *Anopheles quadrimaculatus*"; Journal of the American Mosquito Control Association; bearing a date of 2002; pp. 316-320; vol. 18, No. 4; The American Mosquito Control Association, Inc.

Smith et al.; "The use of vertical-looking radar to continuously monitor the insect fauna flying at altitude over southern England"; Bulletin of Entomological Research; bearing a date of 2000; pp. 265-277; vol. 90; CAB International, 2000.

Spitzen et al.; "Track3D: Visualization and flight track analysis of *Anopheles gambiae* s.s. mosquitoes"; Proceedings of Measuring Behavior 2008; bearing dates of Aug. 26-29, 2008; pp. 133-135.

Chinese State Intellectual Property Office, Office Action, App. No. 201080010510.7 (Based on US Patent Application No. PCT/US2010/000111); Nov. 26, 2012; pp. 1-22; (no translation provided).

* cited by examiner

PHOTONIC FENCE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application claims benefit of priority of U.S. Provisional Patent Application No. 61/205,430, entitled PHOTONIC FENCE, naming Roderick A. Hyde, Eric Johanson, Jordin T. Kare, Nathan P. Myhrvold, Thomas J. Nugent, Jr., Nels R. Peterson, Lowell L. Wood Jr. as inventors, filed Jan. 15, 2009, which was filed within the twelve months preceding the filing date of the present application, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary or admission as to whether or not the present application contains any new matter in addition to the matter of its parent application(s).

SUMMARY

In one aspect, a system for tracking airborne organisms includes an imager (e.g., a camera or scanner), a backlight source (e.g., a retroreflector), and a processor. The processor is configured to analyze one or more images captured by the imager including at least a portion of the backlight source and to identify a biological property (e.g., genus, species, sex, mating status, gravidity, feeding status, age, or health status) of an organism (e.g., an insect, such as a mosquito, a bee, a locust, or a moth) in the field of view of the imager, using characteristic frequency, harmonic amplitude, shape, size, airspeed, ground speed, or location. The system may further include an illumination light source arranged to illuminate the field of view of the imager. The organism may have wings, in which case the processor may be configured to identify the biological property using a wingbeat frequency.

The system may further include a detector configured to detect a signal indicative of a property of an organism in the field of view of the imager. For example, the detector may include a photodiode, which may be configured to detect light from an optional targeting light source configured to be directed at the organism, or light from the backlight source. The targeting light source may be configured to be directed at the organism from a plurality of directions (e.g., a group of spotlights or LEDs which may be placed at positions surrounding an expected organism location). The detector may be configured to detect a signal indicative of a distance from the imager to the organism, for example by detecting shadows cast by the organism in a plurality of targeting light sources (which may, for example, be different colors or be configured to be selectively switched on and off), or by using a plurality of optical position sensing devices to triangulate the organism. The processor (or a second processor) may be configured to use this signal to determine a distance from the imager to the organism. Alternatively, the processor may use one or more images captured by the imager to determine the distance to the organism, for example in cases where the imager includes a plurality of imaging devices, which may function in the same ways as the targeting light sources described above. The detector may have a bandwidth greater than one-half of a frame rate of the imager, or less than or equal to a frame rate of the imager, and may have an image resolution or field of view greater or smaller than that of the imager. The detector may also be acoustic.

In another aspect, a method of tracking airborne organisms includes acquiring a first image from an imager, the imager having a backlight source (e.g., a retroreflector) in its field of view, determining that the image includes an organism at a location, acquiring a second image, and determining a biological property (e.g., genus, species, sex, mating status, gravidity, feeding status, age, or health status) of the organism using the second image (e.g., by determining characteristic frequency, harmonic amplitude, shape, size, airspeed, ground speed, flight direction, flight path, or location). The first and second images have different resolutions (e.g., the first image may be finer or coarser than the second image), or they are acquired at different frame rates (e.g., the second image may be acquired at a faster or slower frame rate than the first). The images may also differ in size. Acquiring the first or second image may include illuminating the region of the acquired image, for example with a laser or an LED. Acquiring either image may include acquiring a series of images. The images may both be acquired by the imager, or the second image may be acquired by a different device (e.g., a photodiode).

In another aspect, a system for disabling airborne organisms includes an imager (e.g., a camera or scanner), a backlight source (e.g., a retroreflector), a processor, and a disabling system. The processor is configured to analyze one or more images captured by the imager including at least a portion of the backlight source and to identify a biological property (e.g., genus, species, sex, mating status, gravidity, feeding status, age, or health status) of an organism (e.g., an insect, such as a mosquito, a bee, a locust, or a moth) in the field of view of the imager, using characteristic frequency, harmonic amplitude, shape, size, airspeed, ground speed, or location. The disabling system is configured to disable the organism (e.g., by killing, damaging a wing or antenna, or impairing a biological function) responsive to the identified property (e.g., only disabling organisms of a determined genus, species, sex, or gravidity). The disabling system may include a laser (e.g., a UV-C laser or an infrared laser), and may be configured to accept location data from the processor for use in targeting the organism.

In another aspect, a method of disabling airborne organisms includes acquiring a first image from an imager, the imager having a backlight source (e.g., a retroreflector) in its field of view, determining that the image includes an organism at a location, acquiring a second image, determining a biological property (e.g., genus, species, sex, mating status, gravidity, feeding status, age, or health status) of the organism using the second image (e.g., by determining characteristic frequency, harmonic amplitude, shape, size, airspeed, ground speed, flight direction, flight path, or location), and disabling the organism responsive to the determined biological property (e.g., killing the organism or impairing a body function such as mating, feeding, flying, hearing, acoustic sensing, chemosensing, or seeing). The first and second images have different resolutions (e.g., the first image may be finer or coarser than the second image), or they are acquired at different frame rates (e.g., the second image may be acquired at a faster or slower frame rate than the first). The organism may be disabled, for example, by directing a laser beam at the organism (optionally using targeting information obtained from one or both of the acquired images), by directing an acoustic pulse at the organism, by releasing a chemical agent, or by directing a physical countermeasure at the organism.

In another aspect, a system for identifying status of flying insects in a region includes an imager, a backlight source (e.g., a retroreflector) configured to be placed in the field of view of the imager, and a processor configured to analyze one or more images captured by the imager including at least a portion of the backlight source, the processor being configured to identify probable biological status of an insect in the field of view of the imager using characteristic frequency, shape, size, airspeed, ground speed, or location. The insect may be a mosquito, in which case the processor may be configured to determine a probability that the mosquito is infected with malaria. The processor may be configured to gather probable biological status of a plurality of insects, for example gathering population data for a population of insects, or gathering probable biological status data as a function of an environmental parameter (e.g., time of day, season, weather, or temperature).

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
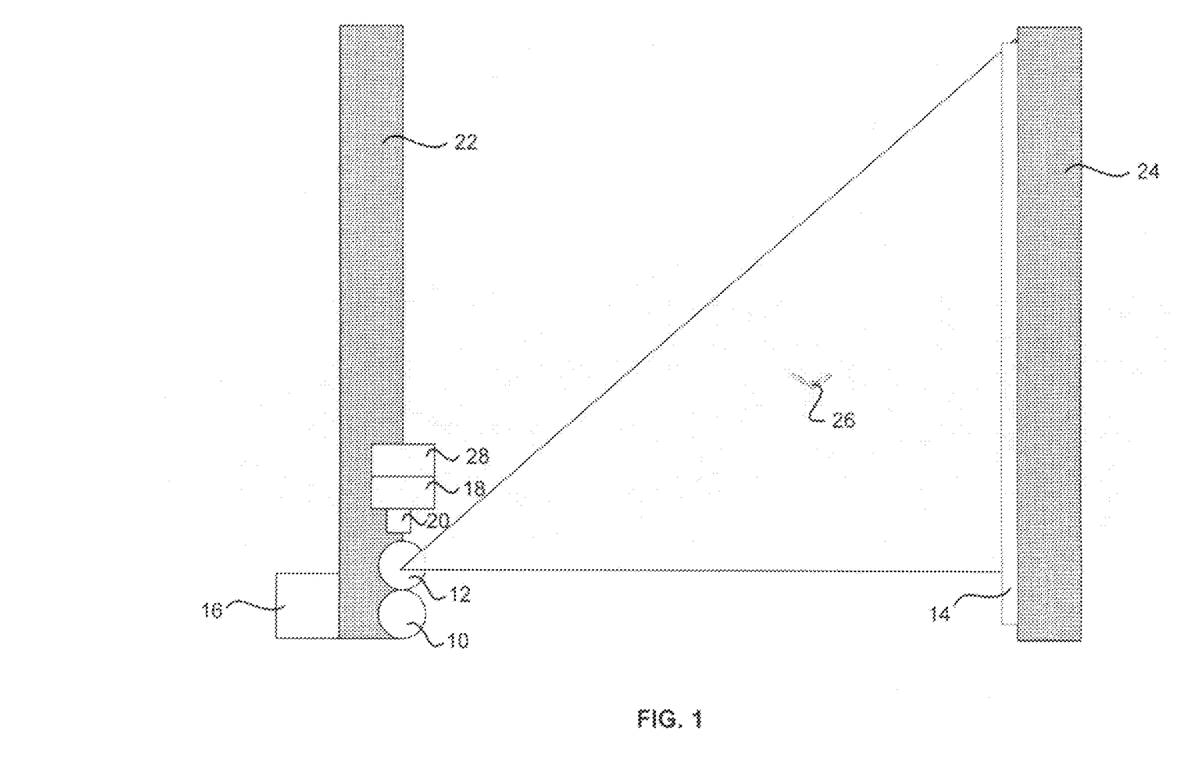
FIG. 1 is a schematic of a detection system.

As shown in FIG. 1, a system for locating or identifying information about, or optionally disabling insects or other organisms includes an imager 10, illumination source 12, a retroreflective surface 14, a processor 16 configured to analyze images captured by the imager 10, a targeting laser 18, and a photodiode 20. In the illustrated embodiment, imager 10 is a CMOS camera placed at the base of support post 22, but a variety of other imagers may be appropriate. For example, CCD-based detectors, scanning systems, or other types of detectors may be implemented. Moreover, in some approaches two or more imagers may be placed on support post 22 or on other supports. In some embodiments, retroreflective surface 14 may be replaced with a light emitting surface (backlight), for example a substantially uniform light emitting surface with a desired angular distribution at light, which may be aimed toward imager 10.

Figure 2:
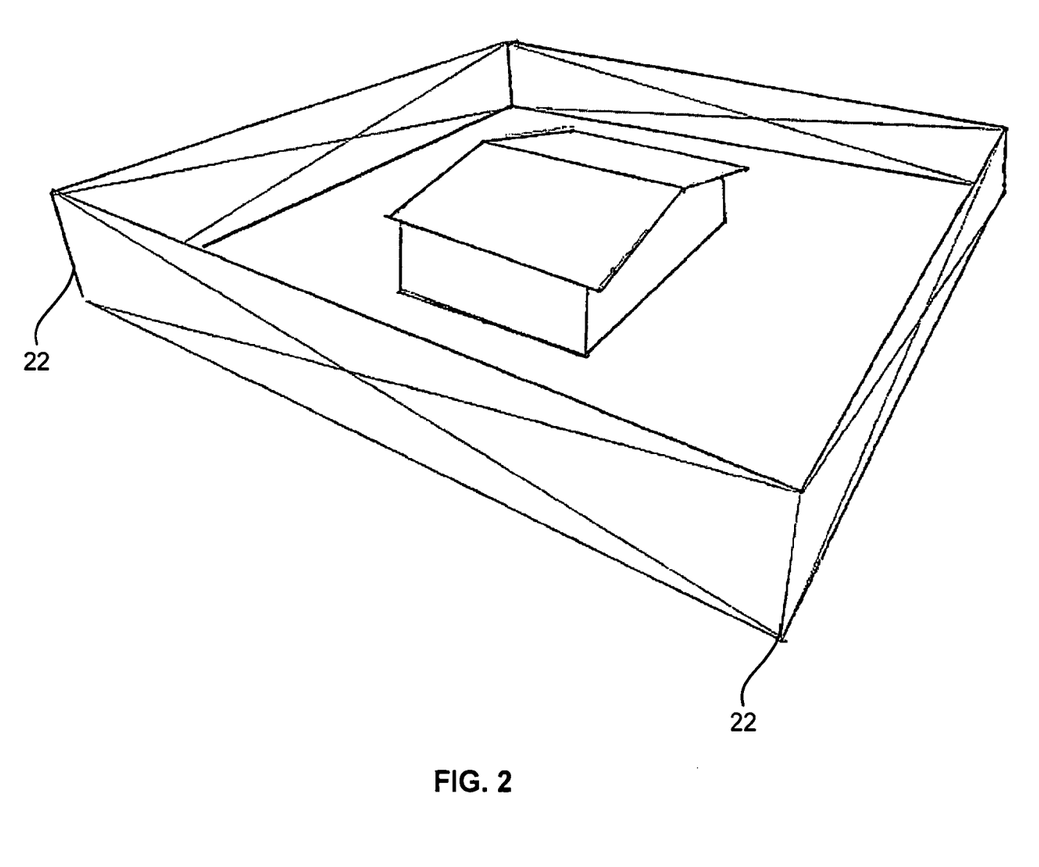
FIG. 2 illustrates an embodiment of a system surrounding a structure.

As illustrated, retroreflective surface 14 is placed on adjacent support post 24 spaced apart from the support post 22 to define an intermediate region. In some embodiments, imagers or retroreflective surfaces may be placed on multiple support posts. For example, in some embodiments, support posts may be arranged to surround an area of interest, as illustrated in FIG. 2, and imagers or retroreflective surfaces may be arranged on the support posts so as to view all, substantially all, or at least a portion of the entrances to the area of interest. While elements placed on support post 22 in FIG. 1 have been placed apart for clarity in illustration, in practice they may be more closely spaced.

In the illustrated embodiment, support posts 22 and 24 have a height selected to exceed the typical flying height of an insect of interest. For example, more than 99% of *Anopheles* mosquitoes (which may carry strains of malaria that can infect humans) fly at less than 3-5 meters of altitude, so support posts of 3-5 meters may be used in a system that can view substantially all mosquitoes passing through an area of interest. The width of support posts 22 and 24 is selected to provide adequate support and surface area for components including retroreflective surface 14; in the illustrated embodiment, the support posts are 10-20 cm wide, and are placed 100 m apart. The width of retroreflective surface 14, and of the field of view of imager 10, may be selected as a function of the flight speed of the target(s) of interest and the frame rate of imager 10, such that the silhouette of an insect will be within the field of view for at least one full frame interval, and as a function of the flight speed and the desired wingbeat sensing accuracy, such that the silhouette will be within the field of view for a sufficient period to make a measurement of the desired accuracy.

Illumination source 12 (which may be, for example, a laser, an LED, an incandescent light, a mirror reflecting sunlight, or any other suitable light source) directs light from support post 22 toward support post 24 to illuminate the retroreflective surface 14 on support post 24. In the illustrated embodiment, illumination source 12 is an LED producing a fan-shaped beam. Retroreflector 14 returns light to imager 10. When an organism 26 (such as a mosquito) travels between posts 22 and 24, the organism appears as a dark shadow on the retroreflective background 14 or as a break in a beam of light. Upon detecting such a shadow, in some embodiments, imager 10 may shift to a higher frame rate or a higher spatial resolution local to the shadow. alternatively, a second imager (not shown) may be employed to collect a higher frame rate or higher resolution image in a small region local to the shadow. The higher frame rate image may be used, for example, by processor 16 to identify a wingbeat frequency for the mosquito (or other flying organism). Wingbeat frequency and harmonics may be used to determine probable species, sex, and other biological properties such as mating status of a mosquito; for some information on characteristic frequencies, see Robertson, et al., "Heritability of wing-beat frequency in *Anopheles quadrimaculatus*," *J. Amer. Mosquito Control Assoc.*, 18(4):316-320 (2002); Moore, "Artificial Neural Network Trained to Identify Mosquitoes in Flight," *J. Insect Behavior*, 4(3):391-396 (2005); "An Automated Flying-Insect Detection System," *NASA Technical Briefs*, SSC-00192 (2007), available at http://www.techbriefs.com/content/view/2187/34/; Göpfert, et al., "Nanometre-range acoustic sensitivity in male and female mosquitoes,"*Proc. Biol. Sci.* 267(1442):453-457 (2000); and Gibson, et al., "Flying in Tune: Sexual Recognition in Mosquitoes," *Curr. Biol.* 16:1311-1316 (2006), all of which are incorporated herein by reference.

In some embodiments, harmonic frequency spectra may be of significant utility in identifying mosquitoes or other insects. For example, the second harmonic frequency of the wingbeats of certain honeybee species are substantially similar to the wingbeat frequency of certain species of mosquitoes. Thus, in some embodiments, spectral analysis of harmonic frequencies may be used to prevent spurious identification of honeybees as mosquitoes. In addition, concentrating on higher-frequency harmonics may allow faster detection and identification of insects in some embodiments by reducing the time period necessary to identify the frequencies present.

In some embodiments, processor 16 may incorporate a graphics processing unit (graphics card) for analysis. The graphics processing unit (GPU) may have a parallel "many-core" architecture, each core capable of running many threads (e.g., thousands of threads) simultaneously. In such a system, full-frame object recognition may be substantially speeded as compared to traditional processors (e.g., 30 times as fast). In some embodiments, a field-programmable gate array may be directly connected to a high-speed CMOS sensor for fast recognition.

In addition to the higher-speed camera imaging of the organism, the system may also employ a targeting laser 18 (or other suitable nonlaser light source) and detector (such as photodiode 20) to confirm characteristics of organism 26. For example, if processor 16 identifies a morphology or frequency suggestive of an organism of interest (such as a mosquito), targeting laser 18 may be directed at organism 26 using location information from processor 16. The reflection of targeting laser 18 from organism 26 is detected by photodiode 20. In some embodiments, this reflection may have relatively lower image resolution but a very fast frame rate, wide frequency response, or a high sensitivity to changes in cross section of the organism. The signal from the photodiode may be used, for example, to measure wingbeat frequency or harmonics very accurately to identify the organism or to otherwise classify the organism into an appropriate category, or otherwise distinguish the organism. Targeting laser 18 may also or alternatively provide additional light for higher frame rate or higher resolution image acquisition by imager 10.

The second imager or targeting laser 18 may be aimed by a galvanometer, MEMS device, or other suitable optical pointing systems. In some embodiments, the second imager or targeting laser 18 may be aimable in two dimensions, while in others, a single-axis galvanometer system may be used to allow the targeting laser to track within a single firing plane. In one-dimensional systems, a series of two-dimensional images captured by imager 10 may be used to predict when organism 26 will cross the firing plane, at which point it may be illuminated by targeting laser 18. In some embodiments, targeting laser 18 may be continuously scanned through space, for example by a rotating or oscillating mirror, and fired when its projected path intersects with the organism. In some such embodiments, the scan path may be dynamically adjusted, for example to provide a dwell time at a target location.

While the targeting laser 18 is described as being aimed by a galvanometer, MEMS device, or other targeting system, such aiming may be implemented via direct physical positioning of the laser, or through direction by an optical system, including conventional optical components, such as acoustical optic scanners, scanning mirrors, or similar.

Figure 3:
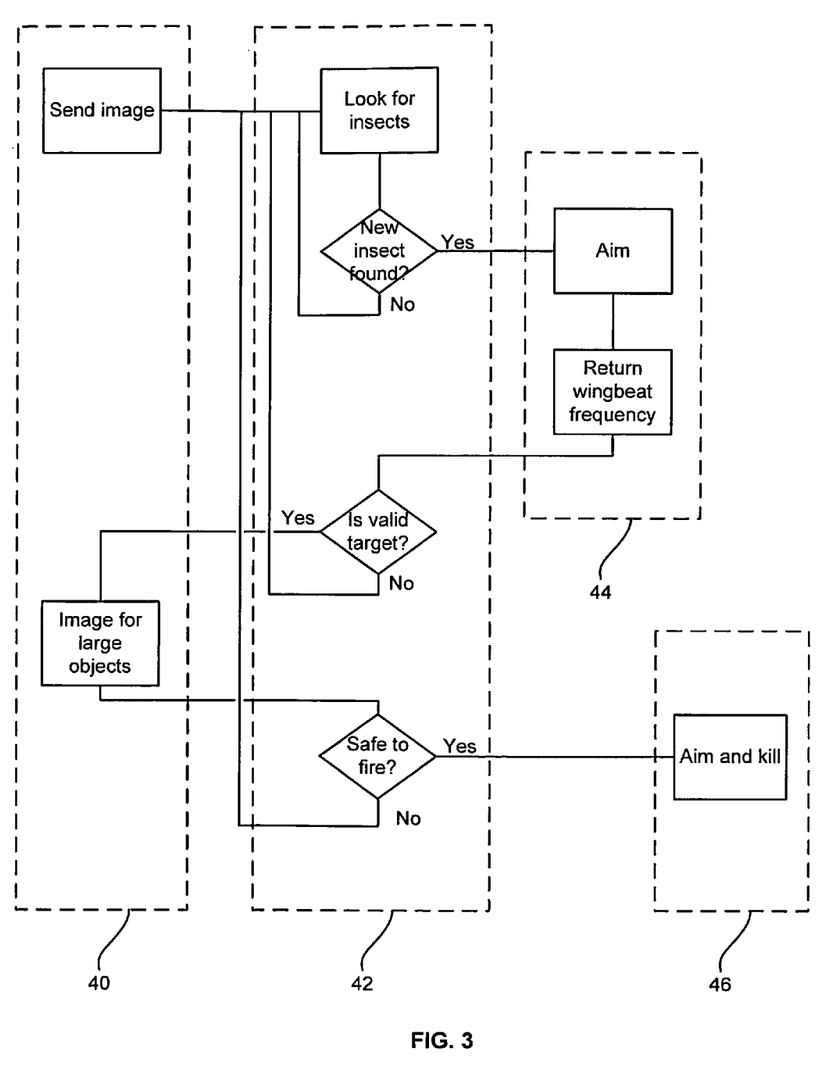
FIG. 3 is a control flow diagram for an implementation of a tracking and dosing system.

In some embodiments, once the organism has been identified or otherwise categorized or characterized, it may be desirable to take action to disable or destroy the organism. For example, in some embodiments, when a mosquito has been detected as entering the field of view, a countermeasure such as a laser beam may be used to disable or destroy the mosquito. In such embodiments, location information for the organism 26 may be passed from the imager 10, the processor 16, the targeting laser 18, or an associated targeting processor, not shown, to a dosing laser 28. In some embodiments, other countermeasures might include a sonic countermeasure transmitted by an acoustic transducer, a physical countermeasure such as a solid or liquid projectile, or a chemical response, in lieu of or in addition to dosing laser 28. In some embodiments, targeting laser 18 and dosing laser 28 may be the same component, for example using a higher amplitude for dosing than for targeting. In other embodiments, targeting laser 18 and dosing laser 28 may be separate components. In this case, they may optionally use a common aiming mechanism such as a beam splitter or beam combiner that allows dosing laser 28 to fire along the same path as targeting laser 18. FIG. 3 is a control flow diagram for an implementation of the tracking and dosing system, illustrating cooperation of imager assembly 40, processor 42, targeting laser assembly 44 and dosing laser assembly 46.

Figure 4:
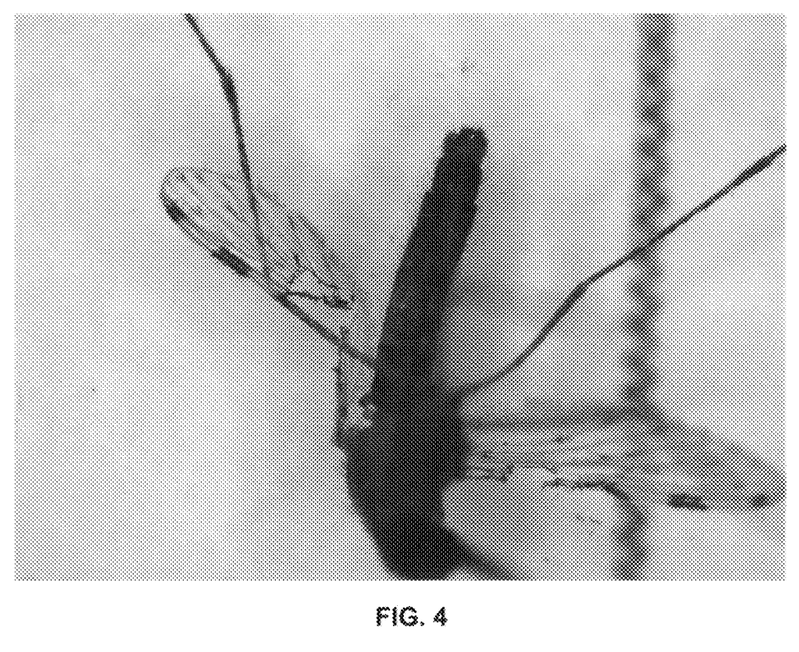
FIG. 4 is a photograph of a damaged mosquito wing.

In some embodiments, undesirable organism 26 may be killed by dosing laser 28. In other embodiments, dosing laser 28 may instead disable organism 26 in a variety of ways. For example, if it is desired to inhibit spread of malaria, it may be sufficient to impede a female mosquito's ability to blood feed, disrupting the disease cycle. In some embodiments, this may be accomplished by damaging or destroying the antennae. Damage to the antennae may also inhibit mating behavior, which may reduce the overall mosquito population if enough mosquitoes in a region can be dosed. In some embodiments, reproduction may also be slowed or prevented by impairing fertility of the female or the male mosquito. Radiative treatment may also impair the metabolic efficiency of mosquitoes or other insects, or may damage essential body structures such as the wings or eyes without immediately killing the insect. FIG. 4 is a photo of a mosquito wing which has been damaged by laser treatment.

In some embodiments, rather than or in addition to targeting organisms for destruction, the system of FIG. 1 may be used as a census-taking device. If desired, the system may be left unattended for a substantial period of time to determine activity as a function of time of day, weather, season, or other changing environmental parameters, and flight characteristics of different organisms may be tracked over time. By analyzing shape, size, wingbeat frequency, wingbeat harmonics, position, flight patterns, airspeed, or groundspeed, information about biological properties such as genus, species, gender ratios, age distribution, mating status, and the like may be determined for the organism population. In some embodiments, it may be possible to determine disease-carrying status, since it is expected that disease carriers such as malarial mosquitoes will have different characteristics perceivable by the system (e.g., flight characteristics, shape, size) due to body stresses associated with illness. In some embodiments, these characteristics of disease-carrying organisms may be identifiable via statistical bias (e.g., while the system may not identify individuals as diseased, it may be able to tell that some fraction of the individuals observed are diseased). Such embodiments may be useful for targeting disease mitigation strategies into areas of highest infection rate, for example. In embodiments including a dosing laser or other countermeasure, in circumstances where it is undesirable or impractical to incapacitate all mosquitoes (or other insect pests), discrimination by sex or other biological status may allow more effective eradication of the population as a whole (for example, by preferentially targeting gravid females, females ready for mating, or mosquitoes already infected with malaria).

While the embodiments described herein have related to ground-based systems mounted upon fixed vertical supports, a variety of other design configurations may be implemented by one of skill in the art. In some embodiments, a substantial portion of the components or even all of the components may be mounted upon a single support unit. For example, a single post having lasers and cameras at the top may illuminate and view a surrounding horizontal ring of retroreflector, forming a conical or tent-like detection area. For another example, one or more lasers and cameras may be rotated or translated so as to sweep the narrow camera field of view across a large volume, so as to detect insects anywhere within a volume (such as a room); in this case a large area of retroreflector material such as a retroreflective paint or tape can be applied to one or more walls of the room.

In one approach, one or more components may be mounted on a moving support such as a ground-based vehicle, air-based vehicle (e.g., a UAV), or other vehicle. If imager and targeting or dosing lasers are mounted on an airborne vehicle, it may be impractical to provide a retroreflective surface as described above. In some such embodiments, organisms may be located by ground-looking radar. For a vehicle traveling at 50 m/s and scanning a 100 m swath of ground, a relatively modest transmitter power (in the tens to hundreds of milliwatts) may provide an adequate resolution for locating organisms for a targeting laser.

In some embodiments, the imager or the detector may receive light that is produced responsive to the illuminating light. For example, as described in Bélisle, et al., "Sensitive Detection of Malaria Infection by Third Harmonic Generation Imaging," *Biophys. J.* 94(4):L26-L28 (2008), which is incorporated herein by reference, certain components of tissue or residue such as biological waste products (e.g., hemozoin crystals produced by malarial mosquitoes) may produce wavelengths of light different from the illuminating light through any of a variety effects, including three photon effects. In one such approach, illuminating light may be selected to correspond to a response of hemozoin. The detector may then detect light at a frequency corresponding to a resonance of the hemozoin.

It may be appropriate in some applications to provide a guard region around the targeting or dosing light beam. In such an approach, an appropriate detection system may determine the presence of objects or organisms within a region surrounding the target object. If such an object or organism is detected, the system may determine that it is inappropriate to activate the targeting or dosing light source, for example, to prevent damage to such objects or organisms. In one example, the guard region may be configured to detect the presence of humans or domestic animals within a selected proximity of the area to be illuminated. Such systems may be implemented using the illuminating light source, or an alternative light source, such as an LED or similar source arranged to illuminate a region surrounding the expected path of the targeting or dosing beam. Alternatively, the imaging system may detect humans or domestic animals in the field of view and avoid transmitting the targeting or dosing light beam.

In some cases the illuminating light source may have sufficient power to cause harm, for example if a person or animal looks directly into the light source. The system may be configured to detect the presence of large obstructions and turn off or reduce the power of the illuminating light source before harm is done.

It will be understood that "identification" of organisms (such as mosquitoes and other insects) on the basis of wingbeat characteristics, morphology, or other measurements, may be probabilistic in nature. For example, it may be determined that it is more likely than not that a given organism is a gravid female *Anopheles* mosquito, and actions may be taken on that probability, even though other genera, sexes, or statuses cannot be ruled out.

Maintenance and Olfactory Testing of Mosquito Population

We have maintained and tested a population of *Anopheles stephensi* in an insectary. The mosquitoes were kept in a maintained environment of a 12 h:12 h light:dark cycle; air temperature 80° F.±10° F. and 80%±10% humidity. Adult mosquitoes were held in a variety of containers. Breeding populations were placed into 12"×12" white semi-transparent plastic containers with plastic mesh sides and a front sleeve for easy access. To sugar feed the adults, we used a Petri dish full of raisins. We placed a Petri dish lined with 9 cm filter paper, filled with water inside the cage. This dish functioned as water source as well as an egg laying cup. The bottom of the cage was covered with absorbent paper towel to limit fungal growth due to urine and blood excretions of the females.

When adult mosquitoes were about six to ten days old, we blood fed the females while they were still inside their cages. We used Hemostat brand sheep blood. The feeding apparatus was a 10 cm Plexiglass Petri dish which had a copper coil tube glued to the bottom and circulated warm water to keep the blood at body temperature. The bottom of the feeding apparatus was filled with water at 98° F. We stretched parafilm to loosely cover the water in Petri dish. Then sheep blood was added to the apparatus and another layer of Parafilm was stretched to cover the blood. A bucket of water between 98 and 100° F. was placed in the insectary. It was hooked to the copper tubing of the feeding apparatus using plastic tubing and fittings. Inside the bucket there was an aquarium pump and a heater that circulated the warm water to the feeding apparatus. The feeding apparatus was placed in a cage through the sleeve. The sleeve was secured around the plastic tubing and mosquitoes were allowed to feed until satiation. Once females had taken blood, they were observed to find a quiet spot to rest and digest. Three to five days later eggs were laid in groups of 50 to 200 on the surface of the water. These eggs hatched after two days. (See, Benedict, M. Q., in *Molecular Biology of insect disease vectors*. Ed. Crampton, Beard and Louis. Chapman and Hall, London, pp. 3-12, 1997, which is incorporated by reference herein)

Experimental cages, hereinafter referred to as cradle to grave (C2G) boxes, were made of 12"×12" interconnected clear acrylic. The sides and bottoms of the boxes were glued together, and they were reinforced by tabs for additional security. For ease of cleaning and access during manipulation of the mosquitoes, the top of the cage was not glued into place. There were two 6" diameter openings on opposite sides of the cage. The one in the front was covered with a sleeve and the one on the back was lined with fine mesh, providing a texture on which mosquitoes could land. On the front, 2.5" to the right of the sleeve and 2" below, there was a 0.5" diameter pipe fitting covered with mesh. This fitting was used to connect a $CO_2$ tank during anesthetization of mosquitoes. While the mosquitoes were anesthetized, the lid was removed and mosquitoes could be handled for experiments.

There are certain advantages of using a cradle to grave box over other types of mosquito containment cages. Cradle to Grave boxes are clear; they allow the experimenter to observe behavior or document data without obstructed view. Another advantage of the box over conventional cage is limiting the number of times mosquitoes are handled. 50 to 100 pupae were placed in a Cradle to Grave box and allowed to emerge. Once the adult mosquitoes were four to five days old, they were ready for experimental manipulations. The port made of 0.5" pipe fitting can be attached to $CO_2$ for anesthetization; this eliminates the need to chill the mosquitoes, and consequently condensation does not occur during various methods of cold application. Our handling experiences suggest using aspirators during mosquito retrieval may affect their lifespan adversely. In the Cradle to Grave box, there is typically no need to aspirate mosquitoes into other containers.

White plastic rectangular trays (15"×7"×1.5") were used to contain larvae. Once the eggs were laid, they were washed carefully into a white tray for hatching. To provide food for larvae, 50% w/w active (live) baker's or brewer's yeast and ground tropical fish flakes were added to white trays. The trays are filled halfway with distilled water. Achieving the right density of larvae in trays is known to be important in their growth and development. The most common problems associated with overcrowding are longer development time, reduced pupation and eclosion, and a decrease in pupal weight. Studies have shown that crowded larvae exhibit several negative effects: lower weight at emergence, quantity of the blood meal and lower overall fertility rates (Benedict, 1997). If trays are overcrowded, thinning the larvae is preferred to maintain a healthy population. After the fourth molting, pupae develop. Pupae were collected daily and placed into the opaque breeding cages for continuation of the colony, or transferred into clear experimental cages.

Adult mosquitoes were retrieved from their cage into smaller containers using an aspirator made of two clear tubes connected to an electric pump. These retrieval boxes were 3.5"×3.5"×2.5" and made of clear acrylic. One side of the box had a 2.44" diameter opening which is covered with fine mesh and allowed air flow as well as providing a textured surface for mosquitoes. One side of the retrieval box had two 0.5" pipe fittings that were used to connect tubes. These pipe fittings could be plugged with acrylic rods when the aspirator was not in use.

After mosquitoes were anesthetized with $CO_2$ for experimental purposes, fine camel brushes were also used to change the position of the mosquitoes.

To identify and assess the olfactory behavior of mosquitoes, we designed a bioassay, based on an olfactometer similar to that described in Geier et al., *Entomol. Exp. Appl.* 92:9-19, 1999 (which is incorporated by reference herein; see also Braks, et al., *Physiological Entomology* 26:142-148, 2001, incorporated by reference herein), which met the following requirements:

1. Monitoring of all behavioral sequences in the host finding process such as perception, activation, orientation towards the odor source, and landing.
2. Simple and fast testing of many odor samples in a limited time.
3. Easy comparison of extracts from natural odor sources or synthetic attractants see, e.g., Miller, et al., In *Chemical Ecology of Insects*, W. J. Bell, & R. T. Cardé (eds.), Chapman and Hall, New York, pp. 127-157, 1984; Sutcliffe, *Insect Science and its Application* 8: 611-616, 1987, both of which are incorporated herein by reference).
4. Wide measuring range to differentiate the strength of attractive stimuli.
5. Easy clean-up to avoid contamination caused by previous stimuli (Schreck, et al., *J. Am. Mosquito Control Assoc.* 6: 406-410, 1990, which is incorporated herein by reference).

The olfactometer was constructed out of 7 mm thick transparent acrylic sheets. Twelve Y-shaped layers were placed on the acrylic base and bolted together on a metal table. Screened removable chambers were located at each end: a release chamber at the base of the Y-shape, and two chambers at the end of the arms. A transparent removable lid was bolted to the layers below and provided containment for mosquitoes. The resulting construction allowed for easy observation during experiments.

A 12 V fan was attached to the release chamber providing a wind-tunnel effect, luring mosquitoes away from the stimulus. Mosquitoes traveled 89 cm to reach the stimulus chambers.

In a standard experiment, at least 25 female mosquitoes were aspirated into the release chamber using the human hand as bait. This procedure ensured that all mosquitoes used in the test were ready to seek for a host. The release chamber was made of clear acrylic, which was sized 3.22"×3.22"×3.24". Two sides of the release chamber had acrylic screens, one of which was removable for cleaning or other manipulation purposes. The release chamber also had two 0.5" pipe fittings to connect an aspirator or $CO_2$ source as needed.

Five minutes after the release chamber was attached to the olfactometer, the test stimulus was presented in one arm while the control chamber remained empty. At the same moment, the release chamber opened and mosquitoes entered the device. The fan was then turned on to lure the mosquitoes back into the release chamber. Five minutes into the experiment, the mosquitoes were counted (those mosquitoes remaining in the release-, stimulus-, and control chambers, respectively). At the end of the experiment, $CO_2$ gas was pumped through the stimulus chambers and anesthetized mosquitoes transferred back to the insectary.

Olfaction experiments such as those described herein may be used to test attractants for bringing species within range of the targeting system. They may also be used to determine whether mosquitoes' ability to seek human prey has been affected by dosing with photons as described herein.

Mosquito Vulnerabilities

In general, nocturnally active blood-feeding mosquitoes such as the African malaria mosquito *Anopheles gambiae* locate and identify their vertebrate hosts primarily by odor. The olfactory organs in adult female mosquitoes are associated with the antennae and maxillary palp. These are covered by hair-like sensilla. The sensilla are innervated by olfactory receptor neurons as well as by mechano-, thermo-, or hygroreceptor cells. The olfactory cues exhaled in the breath (e.g., carbon dioxide) or excreted from the skin (e.g., components of sweat) are detected by the sensilla, allowing the female mosquito to home in on a potential human host. (See, e.g., Ghaninia et al., *Eur J. Neurosci.* 26:1611-1623, 2007). The dependence upon the antennae and maxillary palp for sensing the proximity of a human host suggests that disruption of these important sensory organs may be a means of preventing mosquitoes from finding and biting their human victims.

Chemical odorants for use in an olfactometer such as lactic acid or ammonia, for example, are available from commercial sources and prepared by standard methods. In some instances, a concentration gradient of odorant from 0.001 to 100 mg/ml, for example, is used to assess the mosquito response. Human sweat for olfaction experiments may be collected from the foreheads or other body parts of human volunteers undergoing physical exercise in a warm, humid environment. The sweat is either frozen immediately to $-20°$ or allowed to incubate at 37° C. for several days. Work from Braks, et al. (referenced above) suggests that while fresh human sweat can be a mild attractant, sweat that has been "aged" is a particularly potent attractant. Other methods for extracting skin odorants include continuous swabbing of human skin with a cotton swab for about 5 minutes or simply inserting a human extremity (e.g., a finger) into the trapping port (see, Dekker, et al., *Medical Veterinary Entomology* 16:91-98, 2002, which is incorporated by reference herein).

In addition to blood meal, female as well as male mosquitoes feed on plant nectar as an energy source, which they locate chiefly by visual and chemical cues.

Nectar sources do not appear to be as attractive as blood sources, but sugar feeding is usually necessary and more frequent than blood feeding (see, e.g., Foster & Hancock. *J Am Mosquito Control Assn.* 10:288-296, 1994, which is incorporated by reference herein). As such, the effects of laser treatment on the ability to locate a nectar source can also be assessed.

The structural integrity of antennae following laser treatment may be assessed using light microscopy or scanning electron microscopy (see, e.g., Pitts & Zwiebel, Malaria J. 5:26, 2006, which is incorporated by reference herein). For light microscopy, the antennae are hand dissected from cold-anesthetized, laser treated or untreated mosquitoes and placed in 25% sucrose and 0.1% Triton X-100 in water. The antennae are mounted on microscope slides in this solution, covered with a glass coverslip, and sealed with, for example, enamel nail polish. Standard light microscopy at 400× magnification is used to assess the integrity of the antennae.

For scanning electron microscopy, the antennae from either laser treated or untreated mosquitoes are hand dissected and fixed with 4% paraformaldehyde, 0.1% Triton X-100 in phosphate buffered saline. The antennae are then dehydrated through a series of alcohol solutions such as ethanol at 50% to 100% in 10% increments. The heads are further extracted through a series of ethanol:hexamethyldisilazane (HMDS) solutions at ratios of 75:25, 50:50, 25:75 and 0:100. The HMDS is removed and the samples are allowed to dry in a fume hood. The desiccated samples are glued onto pin mounts with colloidal silver paint and sputter coated for about 30 seconds with gold-palladium. The samples are viewed using a standard scanning electron microscope. Alternatively, the antennae are quick frozen in liquid nitrogen and subsequently freeze dried to remove any water vapor in preparation for cryo-scanning electron microscopy at $-190°$ C. In some instances, the head or whole mosquito is used for analysis.

Electroantennography (EAG) is a method for recording electrical potentials from insect antennae in response to stimuli and can be used to assess the functional integrity of antennae following treatment with the laser. EAG records the "slow" changes in potential that are caused by the superposition of simultaneous membrane depolarizations of numerous receptor cells in response to stimuli. This approach can provide information on the olfactory perception of the insect. An electroantennogram can be performed by removing the antenna from either laser treated or untreated mosquitoes and inserting wires at either ends of the antenna and amplifying the voltage between. The antenna is exposed to an odorant and any deflections in the electroantennogram waveform due to sensory response are recorded. Alternatively, a laser treated or untreated mosquito is left intact and a ground wire or glass electrode is placed into some part of the body such as the eye, for example, and a second electrode is attached to the end of the antenna. Alternatively, all or part of a laser treated or untreated mosquito is fixed on the tip of a holder with a conducting electrode gel. The tip of the antenna is pushed into a small drop of the same gel associated with a recording electrode (silver wire; see, e.g., Puri, et al., *J. Med. Entomol.* 43:207-213, 2006, which is incorporated by reference herein). The antenna is exposed to odorant and changes in the electroantennogram waveform are noted. Using this approach, the normal response to odorants in untreated mosquitoes can be compared with the response recorded in laser treated mosquitoes.

To assess whether specific sensilla on the antenna or maxillary palp have been damaged by the laser treatment, odor response at the olfactory sensory level can be done using sensilla recording. The sensilla contain olfactory receptor neurons and action potentials of single neurons can be recorded in situ and the olfactory receptor neurons classified according to their response to various odorant stimuli. In this technique, microelectrodes are inserted into the base of a sensillum and moved with a micromanipulator to a position at which electrophysiological activity can be recorded. The signals are digitized and observed as spikes of activity. The antenna is exposed to a puff of odorant and the firing frequency of the neuron is recorded. As above, the normal response to odorants in untreated mosquitoes can be compared with the response recorded in laser treated mosquitoes.

The antennae of mosquitoes are also important for sensing the proximity of a potential mate (see Hoy, *PNAS* 103:16619-16620, 2006; Cator et al., *Science* published on line Jan. 8, 2009, both of which are incorporated by reference herein). More specially, male mosquitoes detect the presence of nearby female mosquitoes by hearing the female's flight tones using a special organ called the Johnston's organ at the base of each antenna. A mosquito detects the particle velocity component of a sound field in its immediate vicinity. The antenna, with its fine, flagellar hairs, senses movements of air particles as they are moved about by incoming acoustic waves. A male mosquito is able to hear a nearby female's wing beat frequency (approximately 300-600 Hz, depending upon the species) and fly off in pursuit. In the case of *Aedes aegypti*, both male and female mosquitoes are able to adjust the harmonic resonance of their thoracic box to produce a harmonic frequency that is three times that of the female wing beat (400 Hz) and two times that of the male wing beat (600 Hz), converging at a frequency of 1200 Hz at the time of mating (Cator et al.). In this instance, mate attraction is acoustically driven and involves active modulation by both sexes.

During the mating process, the ability to hear the appropriate flight tones of a nearby female is dependent upon the antennae and associated Johnston's organ. Likewise, the ability to generate a wing beat frequency capable of attracting a mate is dependent upon functional wings. As such, disabling the antennae or wings would potentially prevent productive mating.

In general, females emerge from the pupal case ready to mate where as their male counterpart in many species may require several days to reach sexual maturity. However, in most species, there is a 24-48 hour lag between emergence and mating. Mating is not needed for egg development and maturation, but in most species eggs can only be deposited when insemination has occurred. Female mosquitoes usually mate before taking their first blood meal, although in several anophelines, a large population of virgins may blood-feed prior to mating. In *Aedes aegypti*, mating is accompanied by the transfer of "matrone", a male hormone which makes the female refractory to successive matings and induces blood host-seeking behavior. This type of behavioral change is not consistently noted in *An. gambiae*. The success of male mating is determined by fitness, and may have consequences for the number of times a male can mate. A number of issues regarding mating behavior have not been fully explored or understood including the cues that control male swarming, male feeding behavior and fitness, female mate-location behavior, pre- and post-mating behavior, frequency of multiple-species swarming, factors that prevent hybridization of closely related species, and factors that control multiple mating (as outlined by Takken et al., in "Mosquito mating behaviour", in *Bridging laboratory and field research for genetic control of disease vectors*. pp. 183-188, Ed. G. J. Knols & C. Louis, Springer, Netherlands, 2006, which is incorporated by reference herein).

Male fitness and associated reproductive success may be a function of an individual's ability to find and exploit a nectar source (see, e.g., Yuval et al., *Ecological Entomology*. 19:74-78, 2008, which is incorporated by reference herein). Males tend to swarm at dusk, a behavior that consumes a considerable amount of energy relative to resting behavior. Females enter the swarm of males for mating purposes (see, e.g, Charlwood, et al., *J. Vector Ecology* 27:178-183, 2003, which is incorporated by reference herein). Sugar feeding in *An. freeborni*, for example, takes place during the night at a time after swarming has concluded and as such nectar sugars are not immediately available for flight but must be stored in some form. As such, disrupting the ability to fly or the ability to find or store an energy source will have deleterious effects on mating success.

Alterations in wing beat frequency in response to laser treatment can be assessed using a particle velocity microphone as described by Cator, et al. (*Science Published on line Jan. 8, 2009*). Either laser treated or untreated mosquitoes are tethered to the end of an insect pin. When suspended in midair, the mosquitoes initiate bouts of wing-flapping flight. Sound clips from normal and laser treated mosquitoes are digitized and compared to assess the effects of laser treatment on wing beat frequency. Alternatively, high speed photography can be used to assess changes in wing function.

Thermal stress may be used to alter the normal embryonic development of mosquito eggs. Huang, et al. demonstrated that subjecting mosquito eggs to increasing temperatures from 40 to 48° C. reduced the viability of the eggs (see, e.g., Huang, et al., *Malaria J.* 5:87, 2006, which is incorporated by reference herein). Exposure to temperatures of 44-45° C. and higher dramatically decrease the number of eggs that hatched. As such, subjecting the female mosquito to laser induced thermal stress may also alter the viability of her eggs.

In one set of experiments, female mosquitoes are allowed to blood feed and are subsequently subjected to laser treatment as described herein. Following a recovery period and prior to laying of eggs, the female mosquitoes are cold-anesthetized and the eggs are dissected out and counted. The eggs may be further subjected to scanning electron microscopy or other forms of microscopy to determine whether treatment with the laser has disrupted the structural integrity of the eggs. For example, the various stages of ovogenesis in mosquitoes may be assessed using scanning electron microscopy (Soumare & Ndiaye. *Tissue & Cell*. 37:117-124, 2005, which is incorporated by reference herein). Alternatively, the females are allowed to lay their eggs following laser treatment. In this instance, the number of eggs laid, the number of hatched eggs, and the number of viable offspring are compared between laser treated and untreated individuals.

In a second set of experiments, female mosquitoes are subjected to laser treatment as described herein prior to blood feeding. After blood feeding, the females are allowed to lay their eggs and as above, the number of eggs laid and the viability of the eggs are determined. In these experiments, the number of females that take an offered blood meal may also be determined in exploring effects on fertility.

Blood feeding is necessary for the process of laying and hatching viable offspring. Disrupting the ability of the female to access blood meal is anticipated to reduce the number of viable offspring. As noted above, the female uses olfaction to find a blood host. As such, in one set of experiments, the blood meal is placed on the other side of a trap portal through which the mosquito must pass to access food. The trap portal emits an attracting human odorant such as human sweat or expired carbon dioxide. The ability of laser treated females to access the blood meal is recorded as is the number of laid eggs, the number of hatched eggs, and the number of viable offspring.

In general, the effects of laser treatment on male and female fertility can be assessed by treating either a population of males or a population of females with laser energy and allowing the treated individuals of one sex to breed with untreated individuals of the other sex. As above, the outcome measurement of this assessment is the number of laid eggs, the number of hatched eggs, and the number of viable offspring. For the purposes of this experiment, male and female individuals are treated with laser energy prior to mating. Male and female individuals can be sexed at the larval stage, allowing for the isolation of single sex populations (see, e.g., Emami, et al., *J. Vector Borne Dis.* 44:245-24, 2007, which is incorporated by reference herein). For example, male *An. stephensi* mosquitoes are identified by a tube-like organ at the $9^{th}$ abdomen segment as well as two fried egg-shaped structures in the anterior portion of the segment. In female *An. stephensi* mosquitoes, the tube-like organ is smaller and the fried egg-shaped structures are absent. Using a light microscope, it is possible to segregate the larva into separate male and female populations. Alternatively, sexing may be done following emergence from the pupal stage. Adult male mosquitoes can be distinguished from adult female mosquitoes in that the males have more feathery antennae and have mouthparts not suitable for piercing skin. The emerged adults in the single sex populations are subjected to laser treatment and after recover are allowed to breed with untreated individuals of the opposite sex. The number of copulas is observed and recorded over a specific time frame. In addition, the number of laid eggs, hatched eggs, and viable offspring are recorded and may be assessed relative to the number of observed copulations. Similar experiments can be performed using populations of male and female mosquitoes that have both been subjected to laser treatment.

Calorespirometry can be used to measure respiration characteristics and energy metabolism of insects (see, e.g., Acar, et al., *Environ. Entomol.* 30:811-816, 2001; Acar, et al., *Environ. Entomol.* 33:832-838, 2004, both of which are incorporated herein by reference). The rates of respiratory metabolism are commonly reported as the rates of oxygen ($O_2$) consumption or carbon dioxide ($CO_2$) production and may be combined with heat production to assess metabolic efficiency. Analysis is done comparing the response of laser treated and untreated mosquitoes. The analysis can be done at one specific temperature such as, for example, an ambient temperature of 27° C. Alternatively, the effects of temperature on metabolic efficiency of treated and untreated mosquitoes can be assessed by performing the analysis at various temperatures ranging from about 0° C. to about 42° C. In this instance, temperature acts as a stressor.

A differential, scanning, heat conduction calorimeter is used for calorespirometry (e.g., Hart Scientific model 7707 or Calorimetry Sciences model 4100, Pleasant Grove, Utah). One or more mosquitoes for analysis are weighed and placed in a small paper cage within a sample ampoule. The cage is used to limit the mobility of the mosquitoes during analysis. The ampoule is supplied with sufficient oxygen to support aerobic respiration for at least one hour. Heat production is measured by the calorimeter and is represented as a function of body weight. $CO_2$ production is assessed by measuring extra heat generated over time when 0.4 M NaOH is included in the ampoule. The interaction of NaOH with the $CO_2$ produced by the respiring tissue generates $Na_2CO_3$ and heat. As such, the difference in heat rate produced by the mosquito sample with and without NaOH represents the heat rate caused by $CO_2$ trapping and consequently the rate of $CO_2$ formation. Analysis of heat and $CO_2$ production is performed at various temperatures to assess the effect of thermal stress on mosquitoes that have been treated with laser energy relative to untreated controls.

Photonic Dosing Experiments

A series of experiments examining the vulnerability to radiation of *An. stephensi* has been performed. Dosing experiments began by removing the food, water, and any other materials from the (floor of the) C2G box. Then the box was moved into the optics room. The mesh holes were loosely covered, and tubing from a $CO_2$ tank was hooked to the port on the C2G box. $CO_2$ was turned on, with the regulator opened up as wide as possible, resulting in roughly 50 scfh for a minute or so, until all of the mosquitoes were anesthetized. Then the $CO_2$ flow was turned down to a much lower level, typically 7-10 scfh.

Figure 5:
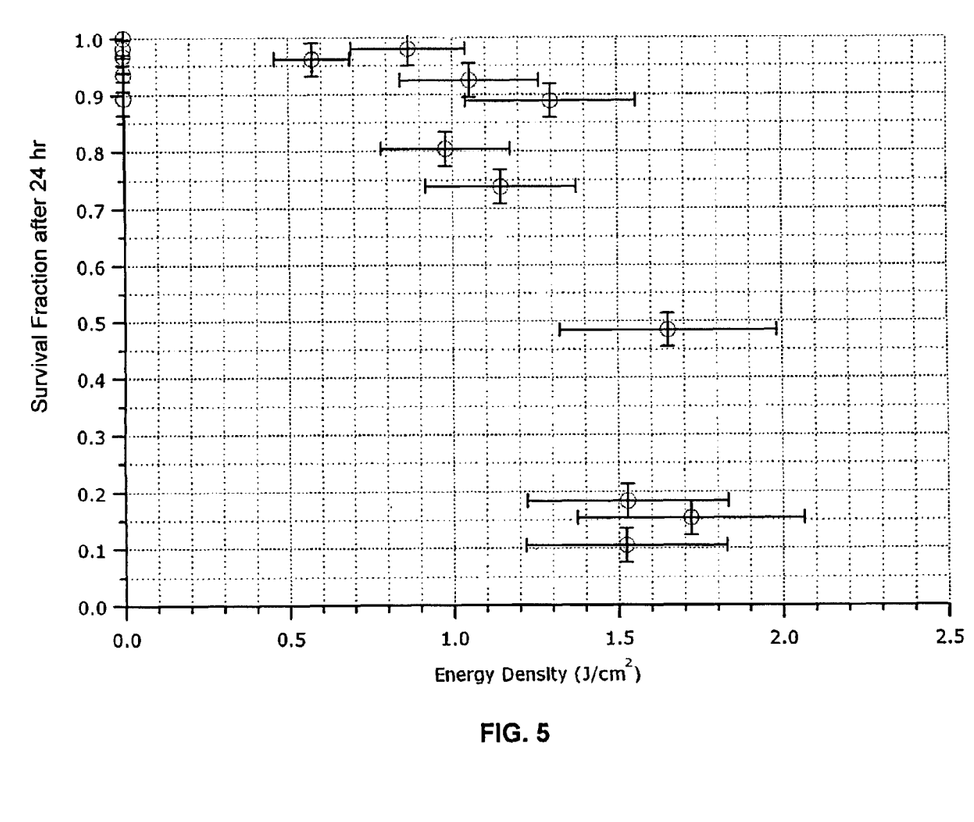
FIG. 5 is a lethality graph for a series of mosquito IR laser exposures.

FIG. 5 is a graph illustrating lethality of various doses of near-IR radiation as a function of energy density. The diode laser, capable of outputting up to 30 W of 808 nm light, was manufactured by Coherent, Inc. Optics were used to focus the beam to roughly 5 mm diameter at the mosquito. Pulse duration was varied from ~3 ms up to ~25 ms, and laser output power was varied from ~15 W up to ~30 W. Mosquitoes present in these experiments were predominantly female, although some males may have been present in some of the experiments. Subjects were exposed to $CO_2$ for 8-15 minutes during the experiments. Lethality is measured 24 hours after dosing.

Figure 6:
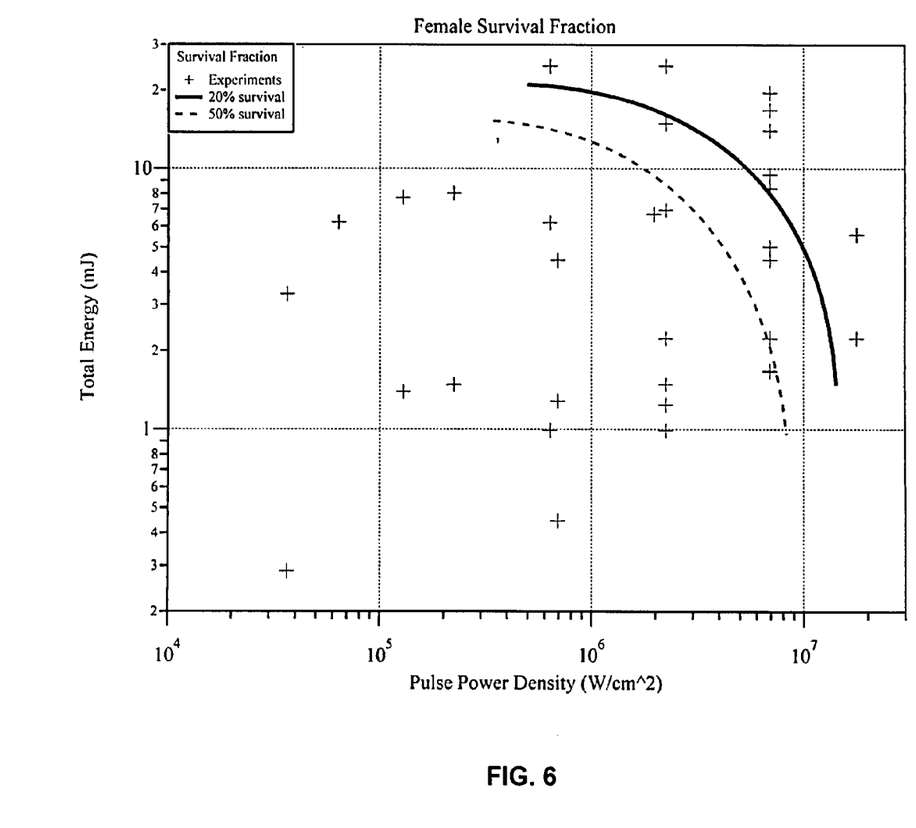
FIG. 6 is a lethality graph for UV laser exposures for female mosquitoes.
Figure 7:
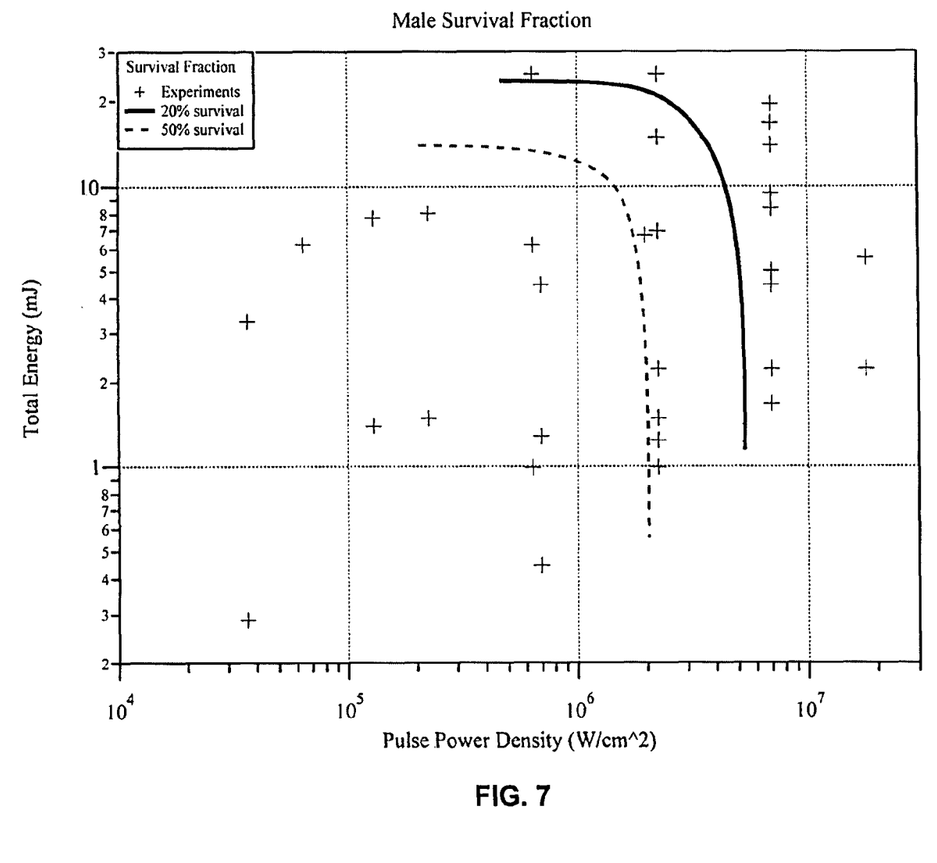
FIG. 7 is a lethality graph for UV laser exposures for male mosquitoes.

FIG. 6 and FIG. 7 are graphs illustrating lethality of various doses of ultraviolet radiation for different power densities and total energies for female and male *An. stephensi*, respectively. The dosing laser for these experiments was a high power water cooled deep UV laser from Photonix, operating at a wavelength of 266 nm. The data underlying these graphs are summarized in Table 1.

TABLE 1

| # Males @ start | # Females @ start | Female Survival % 24 hrs | Male Survival % 24 hrs | Power Density (W/cm 2) | Total Energy (mJ) |
|---|---|---|---|---|---|
| 23 | 11 | 18% | 13% | 6.94E+06 | 16.74 |
| 26 | 27 | 22% | 19% | 6.94E+06 | 8.37 |
| 12 | 40 | 15% | 8% | 1.78E+07 | 5.58 |
| 34 | 8 | 0% | 9% | 1.78E+07 | 2.232 |
| 35 | 11 | 18% | 6% | 6.94E+06 | 2.232 |
| 19 | 12 | 25% | 11% | 2.24E+06 | 1.488 |
| 30 | 16 | 81% | 43% | 3.65E+04 | 0.286 |
| 19 | 16 | 75% | 37% | 3.65E+04 | 3.3 |
| 7 | 24 | 83% | 29% | 2.24E+06 | 1.24 |
| 2 | 22 | 77% | 50% | 2.24E+06 | 0.992 |
| 8 | 21 | 95% | 100% | 6.38E+05 | 6.2 |
| 8 | 18 | 100% | 88% | 6.38E+05 | 0.992 |
| 17 | 26 | 88% | 65% | 6.38E+05 | 6.2 |
| 8 | 24 | 0% | 0% | 6.38E+05 | 24.8 |
| 8 | 18 | 0% | 0% | 2.24E+06 | 24.8 |
| 8 | 17 | 35% | 0% | 1.97E+06 | 6.696 |
| 13 | 21 | 90% | 77% | 1.29E+05 | 7.75 |
| 13 | 20 | 95% | 92% | 1.29E+05 | 1.395 |
| 8 | 12 | 100% | 100% | 6.38E+04 | 6.2248 |
| 7 | 20 | 100% | 100% | 6.94E+05 | 4.464 |
| 4 | 21 | 100% | 100% | 2.24E+05 | 8.06 |
| 4 | 17 | 100% | 100% | 2.24E+05 | 1.488 |
| 4 | 29 | 97% | 75% | 6.94E+05 | 1.2834 |
| 12 | 17 | 100% | 92% | 6.94E+05 | 0.4464 |
| 30 | 8 | 25% | 10% | 6.94E+06 | 19.53 |
| 23 | 17 | 0% | 13% | 6.94E+06 | 9.486 |
| 22 | 22 | 41% | 5% | 6.94E+06 | 4.464 |
| 22 | 19 | 89% | 91% | 0.00E+00 | 0 |
| 22 | 19 | 68% | 45% | 6.94E+06 | 1.674 |
| 8 | 29 | 10% | 25% | 6.94E+06 | 13.95 |
| 16 | 29 | 10% | 0% | 6.94E+06 | 5.022 |
| 10 | 29 | 90% | 30% | 2.24E+06 | 2.232 |
| 22 | 24 | 38% | 9% | 2.24E+06 | 6.944 |
| 14 | 23 | 22% | 21% | 2.24E+06 | 14.88 |

It will be seen that each graph includes two regimes: at lower power densities, survival fraction is primarily a function of total energy deposited in the insect's body. At higher power densities, the energy required to kill an insect decreases, and survival fraction is primarily a function of power density. It is believed that this is due to the optical saturation of absorbing molecules (sometimes described as photobleaching) in the insect's exoskeleton and other surface layers, and the consequent penetration of light into interior tissues which are subject to photochemical damage, particularly of active DNA.

The experiments reported in FIG. 5, FIG. 6, and FIG. 7 use 24-hour survival fraction of mosquito population as a figure-of-merit. In some embodiments, it may be sufficient to disable, rather than kill, mosquitoes or other targets, as discussed elsewhere herein. Further, the life cycle of malaria requires a period of approximately 11-14 days between infection of a mosquito and transmission to a human host. Thus, it may be possible to substantially impact malaria rates by achieving a suitably low 10-day survival fraction, which may require different energies or power densities than those shown in the reported data. Finally, it is unknown to what extent anesthetization and handling may affect energies or power densities required to affect mosquitoes. Experiments similar to those reported in FIG. 5, FIG. 6, and FIG. 7 but using the tracking and targeting systems described herein may provide further information about suitable systems for disabling mosquitoes or other pests.

In a general sense, those skilled in the art will recognize that the various aspects described herein which can be implemented, individually or collectively, by a wide range of hardware, software, firmware, or any combination thereof can be viewed as being composed of various types of "electrical circuitry." Consequently, as used herein, "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes or devices described herein, or a microprocessor configured by a computer program which at least partially carries out processes or devices described herein), electrical circuitry forming a memory device (e.g., forms of memory (e.g., random access, flash, read only, etc.)), or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position or velocity; control motors for moving/distorting lenses to give desired focuses). An image processing system may be implemented utilizing suitable commercially available components, such as those typically found in digital still systems or digital motion systems.

Those skilled in the art will recognize that at least a portion of the devices or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), or control systems including feedback loops and control motors (e.g., feedback for sensing position or velocity; control motors for moving or adjusting components or quantities). A data processing system may be implemented utilizing suitable commercially available components, such as those typically found in data computing/communication or network computing/communication systems.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, or other such similar mode(s) of expression). For example, some or all of a logical expression (e.g., computer programming language implementation) may be manifested as a Verilog-type hardware description (e.g., via Hardware Description Language (HDL) or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "an imager" should typically be interpreted to mean "at least one imager"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two images," or "a plurality of images," without other modifiers, typically means at least two images). Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for tracking mosquitos, comprising:
an imager having an image resolution and a field of view;
a backlight source configured to be placed in the field of view of the imager;
a detector configured to detect a signal indicative of a distance from the imager to an airborne organism; and
a processor configured to analyze one or more images captured by the imager including at least a portion of the backlight source, the processor being configured to identify a biological property of the airborne organism in the field of view of the imager using at least one datum selected from the group consisting of characteristic frequency, harmonic amplitude, shape, size, airspeed, ground speed, and location, the processor being further configured to determine a probability that the mosquito is infected with malaria.

2. The system of claim 1, wherein the backlight source includes a retroreflector.

3. The system of claim 1, further comprising an illumination light source arranged to illuminate the field of view of the imager.

4. The system of claim 1, wherein the detector includes a photodiode.

5. The system of claim 4, further comprising a targeting light source configured to be directed at the organism, wherein the photodiode is configured to detect light from the light source reflected from the organism or light from the backlight source.

6. The system of claim 5, wherein the targeting light source is configured to be directed at the organism from a plurality of directions.

7. The system of claim 1, wherein the detector is acoustic.

8. The system of claim 1, wherein the processor is configured to use one or more images captured by the imager to determine a distance from the imager to the organism.

9. The system of claim 1, wherein the imager includes a plurality of imaging devices.

10. The system of claim 1, wherein the organism is an insect.

11. The system of claim 10, wherein the organism is selected from the group consisting of a mosquito, a bee, a locust, and a moth.

12. The system of claim 1, wherein the organism has wings.

13. The system of claim 12, wherein the processor is configured to identify a biological property of the organism using a wingbeat frequency.

14. The system of claim 1, wherein the processor is configured to identify a biological property of the organism selected from the group consisting of genus, species, sex, mating status, gravidity, feeding status, age, and health status.

15. The system of claim 1, wherein the processor is configured to determine a distance from the imager to the organism using the signal detected by the detector.

16. The system of claim 1, further comprising a second processor configured to determine a distance from the imager to the organism using the signal detected by the detector.

17. The system of claim 1, further comprising a plurality of targeting light sources differing in position, wherein the detector is configured to detect shadows cast by the organism in each light source.

18. The system of claim 17, wherein the targeting light sources of the plurality differ in color.

19. The system of claim 17, wherein the targeting light sources of the plurality are configured to be selectively switched on and off.

20. The system of claim 1, wherein the detector includes a plurality of optical position sensing devices configured to provide range information by triangulation of the organism.

21. The system of claim 1, wherein the detector has an image resolution less than the image resolution of the imager.

22. The system of claim 1, wherein the detector has an image resolution greater than the image resolution of the imager.

23. The system of claim 9, wherein the plurality of imaging devices is configured to stereoimage the organism.

24. The system of claim 9, wherein the plurality of imaging devices are configured to image light of different colors.

25. The system of claim 9, wherein the plurality of imaging devices are configured to be selectively switched on and off.

26. A method of tracking mosquitos, comprising:
providing a system for identifying status of the mosquitos, the system including:
an imager having an image resolution and a field of view;
a backlight source configured to be placed in the field of view of the imager; and
a processor configured to analyze one or more images captured by the imager including at least a portion of the backlight source, the processor being configured to identify probable biological status of a mosquito in the field of view of the imager using at least one datum selected from the group consisting of characteristic frequency, shape, airspeed, and ground speed, the processor being further configured to determine a probability that the mosquito is infected with malaria;
acquiring a first image having a first image resolution from the imager, the imager having a backlight source in its field of view;
determining that the image includes the mosquito at a location;
acquiring a second image having a second image resolution using the imager; and
determining a biological property of the mosquito using the second image,
wherein:
the first image resolution differs from the second image resolution; or
the first image is acquired at a first frame rate, the second image is acquired at a second frame rate, and the first and second frame rates differ from one another.

27. The method of claim 26, wherein acquiring the first image includes illuminating the region of the first image.

28. The method of claim 26, wherein acquiring the second image includes illuminating the region of the second image.

29. The method of claim 26, wherein acquiring the second image includes acquiring a series of images.

30. The method of claim 26, wherein the biological property is selected from the group consisting of genus, species, sex, mating status, gravidity, feeding status, age, and health status.

31. The method of claim 26, wherein determining the biological property includes determining a datum selected from the group consisting of characteristic frequency, harmonic amplitude, shape, size, airspeed, ground speed, flight direction, flight path, and location.

32. The method of claim 27, wherein illuminating the region of the first image includes illuminating the region of the first image with an LED.

33. The method of claim 28, wherein illuminating the region of the second image includes illuminating the region of the second image with a laser beam.

34. A system for identifying status of mosquitos in a region, comprising:
an imager having an image resolution and a field of view;
a backlight source configured to be placed in the field of view of the imager; and
a processor configured to analyze one or more images captured by the imager including at least a portion of the backlight source, the processor being configured to identify probable biological status of a mosquito in the field of view of the imager using at least one datum selected from the group consisting of characteristic frequency, shape, airspeed, and ground speed, the processor being further configured to determine a probability that the mosquito is infected with malaria.

35. The system of claim 34, wherein the processor is configured to gather probable biological status of a plurality of insects.

36. The system of claim 35, wherein the processor is configured to gather population data for a population of insects.

37. The system of claim 35, wherein the processor is configured to gather probable biological status data as a function of an environmental parameter.

38. The system of claim 34, wherein the backlight source includes a retroreflector.

39. The system of claim 37, wherein the environmental parameter is selected from the group consisting of time of day, season, weather, and temperature.

40. A system for identifying status of a mosquito in a region, the system comprising
an imager having an image resolution and a field of view;
a backlight source configured to be placed in the field of view of the imager; and
a processor configured to analyze one or more images captured by the imager including at least a portion of the backlight source, the processor being further configured to identify probable biological status of the mosquito in the field of view of the imager using at least one datum selected from the group consisting of characteristic frequency, shape, size, airspeed, ground speed, and location, the processor being additionally configured to determine a probability that the mosquito is infected with malaria.

41. The system of claim 40, wherein the processor is further configured to gather probable biological status of a plurality of mosquitos.

42. The system of claim 41, wherein the processor is further configured to gather population data for a population of mosquitos.

43. The system of claim 41, wherein the processor is configured to gather probable biological status data of the mosquitos as a function of an environmental parameter.

44. The system of claim 43, wherein the environmental parameter includes at least one of time of day, season, weather, or temperature.

45. The system of claim 40, wherein the backlight source includes a retroreflector.

* * * * *